United States Patent Office 3,202,535
Patented Aug. 24, 1965

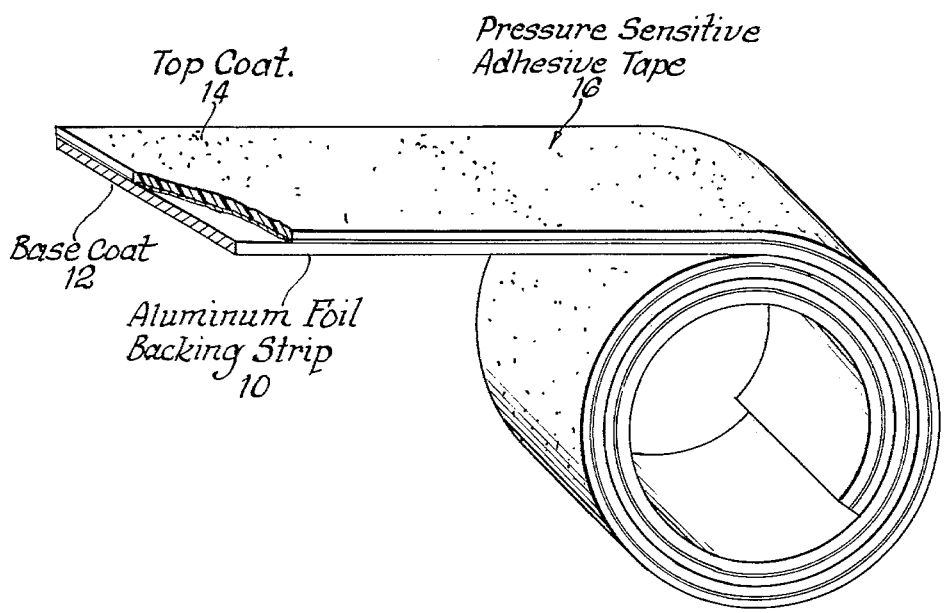

3,202,535
THERMALLY STABLE PRESSURE-SENSITIVE ADHESIVE TAPE AND METHOD FOR MAKING SAME WITH PLURAL SILICONE COATINGS
Raymond A. Gaynes, Oak Lawn, Ill., assignor to Mystik Tape, Inc., Chicago, Ill., a corporation of Illinois
Continuation of application Ser. No. 746,746, July 7, 1958. This application Jan. 22, 1964, Ser. No. 339,527
10 Claims. (Cl. 117—75)

This is a continuation of my application Ser. No. 746,746, filed July 7, 1958, now abandoned, and entitled "Temperature and Light Stable Pressure-Sensitive Adhesive Tape."

The present invention relates generally to the manufacture of pressure-sensitive adhesive tapes, and more particularly to improved heat-resistant, radiation-reflective, pressure-sensitive adhesive tapes characterized by their adaptability to use under widely diverse atmospheric and thermal conditions wherein it is desired that such tapes retain thermal stability and good adhesion properties over a temperature range extending from a low of about −100° F. to a high of about 550° F.

Up to now, a number of pressure-sensitive adhesive tapes have been manufactured comprising a backing sheet having applied to one of its surfaces a conventional pressure-sensitive adhesive usually formulated of a rubber-resin system embodying a resin or resin ester in combination with an elastomer of the type which includes natural rubber or a synthetic elastomeric polymer. The backing sheets employed are generally selected of a fabric, such as a woven cotton textile and the like, or a synthetic resinous film, such as polyvinyl chloride, nitrocellulose and the like. For certain special applications, however, the backing sheets are formed of paper, creped paper, certain non-woven fabrics of interbonding fibers, and thin metallic films such as tin, lead, aluminum and the like. Generally, the backings are large sheets which are coated with the pressure-sensitive adhesive and thereafter cut into strips or bands of a preselected width and wound up about a spool to form rolls for distribution and sale.

While these prior art pressure-sensitive adhesive tapes find extensive uses and possess excellent properties for many diverse applications, I find that the materials used for the backing strips in combination with the rubber-resin system used for pressure-sensitive adhesives are not sufficiently inert to enable the tapes to be used in applications where they will be exposed to extreme temperature conditions, i.e., below 0° C. or above 100° C.

In addition, I find that pressure-sensitive adhesives based on rubber-resin systems are further unsuited for such applications because they become embrittled and lose their adhesiveness at low temperatures and their cohesive strength is materially reduced when the tapes employing them are subjected to temperatures in excess of 100° C.

The prior art proposes, as a solution to these problems, the use of a pressure-sensitive adhesive of the group based upon the silicone resins and a backing sheet in the form of a film of polyethylene and polyethylene derivatives, such as polyethylene terephthalate or fluorinated polyethylene, as represented by tetrafluoroethylene. However, the tapes thus formed are found to be unsatisfactory because the cohesiveness of the pressure-sensitive adhesive is greater than its adhesiveness for the film, with the result that the bonding relation of the film and the adhesive is insufficient to prevent separation of the adhesive from the film.

The present invention is predicated upon my discovery that the desired inertness for use as an insulation material and the desired stability under widely varying, and frequently severe, temperature conditions can be obtained by a tape structure employing an aluminum foil backing successively coated with layers of two different formulations, hereinafter fully described, containing one or more organo-silicon polymers as a principal component.

Accordingly, a prime object of the present invention is to provide an improved pressure-sensitive adhesive tape having high heat-resistant and radiation-reflective properties and particularly characterized by its adaptability for use under widely diverse atmospheric and thermal conditions and which is characterized by thermal stability and its ability to retain good adhesion properties over a temperature range extending from a low of about −100° F. to a high of about 550° F.

Another object of the present invention is to provide a pressure-sensitive adhesive tape in which improved physical properties and performance characteristics are effected by the coaction of a pressure-sensitive top adhesive coat, an intermediary or base coat, and an aluminum foil backing.

A further object of the present invention is to provide a thermally stable, pressure-sensitive adhesive tape in which a pressure-sensitive adhesive layer consisting of a first formulation containing organo-silicon polymers is adherently formed to an aluminum backing by the cohesive and adhesive forces imparted thereto by an intermediary adhesive coating consisting of a second formulation containing certain organo-silicon polymers.

Still another object of the present invention is to provide an improved thermally stable, pressure-sensitive adhesive tape which provides good insulation properties and retains its adhesion properties and flexibility over a wide temperature range extending from a low of about −100° F. to a high of about 550° F.

Another object of the present invention is to provide a thermally stable, pressure-sensitive adhesive tape of the type described which has good shelf life and may be used indefinitely without limitation with respect to the conditions and time of storage.

These and other objects and advantages of this invention will hereinafter appear and for purposes of illustration, but not of limitation, an embodiment of this invention is shown in the accompanying drawing, in which there is a perspective view partially in section of a construction embodying the features of this invention.

These and other objects as shall appear are fulfilled by the present invention in a manner which is easily discerned from the following detailed description of several embodiments exemplifying the present invention.

Essentially the tape structure of the present invention comprises an aluminum foil backing 10 upon which special silicone adhesive compounds are applied as two successive coats 12 and 14. After curing, the thus coated foil provides a pressure-sensive adhesive tape 16 possessed with a totally unexpected combination of desirable properties including the ability to reflect infra-red radiation and white light in a superior manner even under high temperature conditions ranging as high as 500° F. and the ability to retain its thermal stability and adhesive properties over an extremely broad temperature range extending from −100° F. up to 550° F.

Both full hard and dead soft temper aluminum foil may be used in the practice of this invention and may range in thickness from about ½ to about 10 mils. When thin or extremely thin backings are desired, that is, backings having a thickness of from 0.5 to about 5 mils, or preferably from 0.5 to about 3 mils, quite satisfactory tapes may be produced using a satin finish aluminum foil. On the other hand, when backings are desired having a heavier gauge, that is, having a thickness of from about 4 to 10 mils, or preferably from about 7 to 10 mils, equally satisfactory tapes are produced using aluminum foil having a surface which has been mechanically etched according to any of the conventional methods for mechanically etching such surfaces.

The first or "base" coat adhesive 12, according to the present invention, comprises generally a formulation including a silicon resin, i.e., organo-silicon polymers. Suitable organo-siliconpolymers for use in the practice of this invention are described in Patent No. 2,814,601 and marketed by the Dow Corning Corporation, Midland, Michigan, under the trade designation A–4003.

The base coat further comprises an accelerator, such as benzoyl peroxide; 2,4-dichlor-benzoyl peroxide; tertiary butyl perbenzoate and the like, in amounts ranging from 0.1 to 5.0 parts by weight per 100 parts of the resin solids, and preferably about 3.0 parts, to aid in the cure of the organo-silicon; and an inert diluent such, for example, as toluol, xylene, benzol, heptane and the like, in amounts sufficient to give the desired consistency to the paste resulting from a mixture of the base coat ingredients. The variation of consistency depends upon what is appropriate for the method of coating which has been elected. For example, from 60–150 parts by weight of the diluent per 100 parts of the resin will provide a quite satisfactory consistency for use with a knife coater. Varying the amount of a diluent to effect a desired paste consistency is well within the basic knowledge of the artisan and needs no further discussion here.

To aid in a fuller understanding of this invention, the following formulations represent suitable base coat silicone adhesives which may be employed in the practice of this invention:

*Example 1*

| | Parts by weight |
|---|---|
| Silicone resin solids (Dow A–4003) | 100 |
| Benzoyl peroxide | 4 |
| Toluol | 70 |

*Example 2*

| | |
|---|---|
| Silicone resin solids | 100 |
| Benzoyl peroxide | 5 |
| Xylene | 80 |

*Example 3*

| | |
|---|---|
| Silicone resin solids | 100 |
| 2,4-dichlorobenzoyl peroxide | 2 |
| Toluol | 60 |

*Example 4*

| | |
|---|---|
| Silicone resin solids (Dow A–4003) | 100 |
| Tertiary butyl perbenzoate | 3 |
| Heptane | 80 |

*Example 5*

| | |
|---|---|
| Silicone resin solids | 100 |
| 2,4-dichlorobenzoyl peroxide | 1 |
| Xylene | 135 |

The second or "top" coat adhesive 14, according to the present invention, is especially compounded to give heat stability, good cohesive properties, and good adhesive properties.

The formulation of the top coat comprises generally a formulation including a silicone resin, i.e., organo-silicon polymers. The organo-silicon polymers offered for sale by the Dow Corning Corporation, Midland, Michigan, under the trade designations "C–269," "C–271" and "C–274," and described in U.S. Patent No. 2,814,601, are suitable for use in formulating the top coat adhesive. The "C–269," "C–271," "C–274" and "A–4003" resins of Dow Corning Corporation comprise mixtures of elastomeric organo-siloxanes and resinous organo-siloxanes, in each of which the organic groups attached to the silicon atoms are methyl groups. In U.S. Patent No. 2,814,601, the organo-silicon polymers are generically defined as being composed of (1) 40–75% by weight of a benzene soluble resin copolymer of $SiO_2$ units and $R_3SiO_5$ units, where R is of the group methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (a) from 25–60% by weight of a hydroxyl end blocked diorgano-polysiloxane fluid of from 5000 to less than 1,000,000 cs. viscosity at 25° C. in which fluid the organic radicals are of the group methyl, ethyl, vinyl and phenyl radicals, at least 75% of the total number of radicals being aliphatic.

In the formulation of the top coat according to this invention, use is made of an accelerator such, for example, as benzoyl peroxide; 2,4-dichlorobenzoyl peroxide; tertiary butyl perbenzoate and the like, in amounts ranging from 0.1 up to 4 parts by weight per 100 parts of the silicon resin solids; and a filler such, for example, as titanium dioxide, hydrated alumina, zinc oxide, silicon oxide, calcium carbonate, asbestos and the like is incorporated therewith in amounts ranging from 5 to 20 parts by weight per 100 parts of the silicone resin solids. The amounts of filler and accelerator in a given formulation may, within the limits defined, be varied to adjust the adhesive for the desired properties of adhesive tack, etc.

To a mixture of the resin, the accelerator, and the filler, is added an inert diluent such, for example, as toluol, xylene, benzol, heptane and the like, in a quantity sufficient to give the desired consistency to the paste for the method of coating selected. A paste containing from 75 to 200 parts by weight of diluent per 100 parts of resin solids will, for example, provide a quite satisfactory consistency for use with a roller coater. The technique of varying the amount of a diluent to vary the consistency of a resulting paste is, however, a basic skill in the art and needs no further discussion here.

To aid in a more complete appreciation of this invention, the following formulations represent suitable top coat silicone adhesives which may be employed in the practice of this invention:

*Example 6*

| | Parts by weight |
|---|---|
| Silicone resin solids (Dow C–269) | 100 |
| Titanium dioxide | 12 |
| Hydrated alumina | 5 |
| Benzoyl peroxide | 0.6 |
| Toluol | 90 |

*Example 7*

| | |
|---|---|
| Silicone resin solids (Dow A–4003) | 100 |
| Titanium dioxide | 10 |
| Calcium carbonate | 5 |
| Benzoyl peroxide | 3 |
| Toluol | 75 |

*Example 8*

| | |
|---|---|
| Silicone resin solids | 100 |
| Asbestos | 5 |
| 2,4-dichlorobenzoyl peroxide | 3 |
| Xylene | 81 |

*Example 9*

| | |
|---|---|
| Silicone resin solids | 100 |
| Titanium dioxide | 15 |
| Hydrated alumina | 5 |
| Benzoyl peroxide | 2 |
| Toluol | 70 |

*Example 10*

| | |
|---|---|
| Silicone resin solids | 100 |
| Zinc oxide | 17 |
| Hydrated alumina | 2 |
| 2,4-dichlorobenzoyl peroxide | 1 |
| Xylene | 74 |

Example 11

| | |
|---|---|
| Silicone resin solids | 100 |
| Zinc oxide | 20 |
| Tertiary butyl perbenzoate | 5 |
| Benzol | 90 |

Example 12

| | |
|---|---|
| Silicone resin solids | 100 |
| Calcium carbonate | 5 |
| Hydrated alumina | 10 |
| Benzoyl peroxide | 0.5 |
| Toluol | 120 |

In the preparation of a pressure-sensitive adhesive tape in accordance with the present invention, the aluminum foil backing 10, as previously mentioned, is coated with a silicone adhesive compound which is applied in two coats. The first or "base" coat adhesive 12 is a light weight application for bonding to the foil. According to one practice of this invention, satisfactory results are obtained by coating the aluminum foil backing with a sufficient amount of base coat adhesive to provide a dry coating weight of from about 8 to about 16 pounds per ream, and preferably about 12 pounds per ream.

The base coat adhesive may be applied to the aluminum foil backing by any conventional means such, for example, as a knife, a brush, a roller, an air doctor and the like. In those applications in which either satin finish or mechanically etched aluminum foil is used, the base coat will be applied to the dull or roughened surface of the foil as contrasted to the shiny or smooth surface.

After the base coat has been applied uniformly over the surface of the aluminum foil to provide the desired weight, the coated aluminum foil may be fed through a drying oven maintained at a temperature of approximately 140–180° F. until the base coat is dry. Usually 1–5 minutes is sufficient time to dry the base coat under the conditions described.

After the base coat has been dried, the second or top coat adhesive 14 is applied thereto to effect heat stability, good cohesion properties and good pressure-sensitive adhesion properties in the resulting tape.

According to one practice of this invention, quite satisfactory results are obtained by coating the base coat adhesive with a sufficient amount of top coat adhesive to provide a dry coating weight of from about 20 to about 40 pounds per ream, and preferably about 30 pounds per ream.

The top coat adhesive may be applied to the base coated aluminum foil by any conventional means such, for example, as a knife coater, a roller coater, a brush coater and the like.

When the top coat adhesive has been applied uniformly over the surface of the base coat adhesive to provide the desired weight, the top coat may then be cured according to any of the acceptable practices. For example, the twice-coated aluminum foil may be advanced through a drying oven heated to a temperature of 140–200° F. and then through a curing oven heated to about 225–350° F. A cure of 1–5 minutes at 300° F. will provide satisfactory results although the time of cure may be varied inversely to variations in temperature.

The adhesive tape prepared in accordance with this invention are characterized by extreme usefulness for high temperature applications up to about 500° F., for the reflection of infra-red radiation and white light, for its ability to retain thermal stability and adhesion properties over an extreme temperature range extending from −100° F. to 550° F., for its high resistance to corrosion, tearing and bursting, and provides an extremely useful and ambidextrous pressure-sensitive product.

It is, of course, understood that while several embodiments and modifications have been herein described, they are presented to exemplify rather than limit this invention. Accordingly, such variations, modifications and applications of the tape, materials and methods herein described as shall readily occur to the artisan are intended within the spirit of this invention, particularly as it is defined by the appended claims.

I claim:

1. An article of manufacture comprising: a backing formed of aluminum foil; an intermediary coating adherently disposed upon said backing and comprising a heat-cured reaction product of a formulation consisting by weight of 100 parts of an organo-silicon polymeric resin and from 0.1 to 5 parts of an accelerator selected from the group consisting of benzoyl peroxide, 2,4-dichlorobenzoyl peroxide, and tertiary butyl perbenzoate; and a pressure-sensitive adhesive layer adherently formed upon said intermediary coating and comprising the heat-cured reaction product of a formulation consisting by weight of 100 parts of an organo-silicon polymeric resin, from 0.1 to 4 parts of an accelerator selected from the group consisting of benzoyl peroxide, 2,4-dichlorobenzoyl peroxide and tertiary butyl perbenzoate and from 5 to 20 parts of a filler selected from the group consisting of titanium dioxide, hydrated alumina, zinc oxide, silicon oxide, asbestos, and calcium carbonate, and in which the organo-silicon polymeric resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

2. An article of manufacture comprising: a backing formed of aluminum foil having a thickness of from about 0.5 to about 10 mils; a light weight intermediary coating consisting of a heat-cured reaction product of a mixture consisting by weight of 100 parts silicone resin and 0.1 to 5 parts benzoyl peroxide, and a pressure-sensitive adhesive coating on said intermediary coating consisting of a heat-cured reaction product of a mixture consisting by weight of 100 parts silicone resin, from 0.1 to 4 parts benzoyl peroxide and from 5 to 20 parts of a filler selected from the group consisting of titanium dioxide, hydrated alumina, zinc oxide, silicon oxide, asbestos and calcium carbonate, and in which the silicone resin of each coating is composed of mixtures of elastomeric organo-siloxanes and resinous organo-siloxanes in each of which the organic groups attached to the silicon atoms are methyl groups.

3. An article of manufacture comprising: a backing formed of aluminum foil; a light weight intermediary coating formed by weight of 100 parts silicone resin and about 3 parts benzoyl peroxide, and a pressure-sensitive adhesive coating on said intermediary coating consisting of a heat-cured reaction product of a mixture formed by weight of 100 parts silicone resin, from 0.1 to 4 parts benzoyl peroxide and from 5 to 20 parts of a filler selected from the group consisting of titanium dioxide, hydrated alumina, zinc oxide, silicone oxide, asbestos and calcium carbonate, and in which the silicone resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

4. An article of manufacture comprising: a backing formed of aluminum foil; a light weight intermediary coating consisting of a heat-cured reaction product of a mixture formed by weight of 100 parts silicone resin and about 3 parts benzoyl peroxide, and a pressure-sensitive adhesive coating on said intermediary coating consisting of a heat-cured reaction product of a mixture formed by weight of 100 parts silicone resin, 0.6 part benzoyl peroxide, 12 parts titanium dioxide and 5 parts hydrated alumina, and in which the silicone resin of each coating is composed of mixtures of elastomeric organo-siloxanes and resinous organo-siloxanes in each of which the organic groups attached to the silicon atoms are methyl groups.

5. An article of manufacture comprising: a backing formed of from 0.5 to 10 mils thick aluminum foil; an intermediary coating of from 8 to 16 pounds per ream dry weight consisting of a heat-cured reaction product of a mixture consisting by weight of 100 parts silicone resin and 1 to 5 parts benzoyl peroxide, and a pressure-sensitive adhesive coating of from 20 to 40 pounds per ream dry weight on said intermediary coating consisting of a heat-cured reaction product of a mixture consisting by weight of 100 parts silicone resin, from 0.1 to 4 parts benzoyl peroxide and from 5 to 20 parts of a filler selected from the group consisting of titanium dioxide, hydrated alumina, zinc oxide, silicon oxide, asbestos and calcium carbonate, and in which the silicone resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

6. An article of manufacture comprising: a backing formed of from 0.5 to about 5 mils thick aluminum foil having at least one satin finished surface; an intermediary coating of from 8 to 16 pounds per ream dry weight formed upon a satin finished surface of said backing comprising the heat-cured product of a mixture consisting by weight of 100 parts silicone resin and 1 to 5 parts benzoyl peroxide, and a pressure-sensitive adhesive coating of from 20 to 40 pounds per ream dry weight formed upon said intermediary coating by heat curing a mixture consisting by weight of 100 parts silicone resin, from 0.1 to 4 parts benzoyl peroxide and from 5 to 20 parts of a filler selected from the group consisting of titanium dioxide, hydrated alumina, zinc oxide, silicon oxide, asbestos, and calcium carbonate, and in which the silicone resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in whch copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

7. An article of manufacture comprising: a backing formed of from about 5 to 10 mil thick aluminum foil having at least one mechanically etched surface; an intermediary coating of from 8 to 16 pounds per ream dry weight formed upon a mechanically etched surface of said backing comprising the heat-cured product of a mixture consisting by weight of 100 parts silicone resin and 1 to 5 parts benzoyl peroxide, and a pressure-sensitive adhesive coating of from 20 to 40 pounds per ream dry weight formed upon said intermediary coating by heat curing a mixture consisting by weight of 100 parts silicone resin, from 0.1 to 4 parts benzoyl peroxide and from 5 to 20 parts of a filler selected from the group consisting of titanium dioxide, hydrated alumina, zinc oxide, silicon oxide, asbestos, and calcium carbonate, and in which the silicone resin of each coating is composed of mixtures of elastomeric organo-siloxanes and resinous organo-siloxanes in each of which the organic groups attached to the silicon atoms are methyl groups.

8. The process comprising: coating a thin sheet of aluminum foil with a first paste consisting essentially of 100 parts by weight silicone resin, 1 to 5 parts by weight benzoyl peroxide, and sufficient inert diluent to render the paste workable; drying the first paste coat; coating the coated backing with a second paste consisting essentially of 100 parts by weight silicone resin, 0.1 to 4 parts by weight benzoyl peroxide and 5 to 20 parts by weight of a filler selected from the group consisting of titanium dioxide, hydrated alumina, zinc oxide, silicon oxide, asbestos, and calcium carbonate; drying the second paste coat; and curing the silicone resin, and in which the silicone resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

9. The process comprising: coating a thin sheet of aluminum foil with from 8 to 16 pounds dry weight per ream of a first paste consisting essentially of 100 parts by weight silicone resin, 0.1 to 5 parts by weight benzoyl peroxide, and sufficient inert diluent to render the paste workable; heating the coated backing to a temperature of from 140° to 180° F. for a period of from 1 to 5 minutes; cooling the heated coated backing; coating the coated backing with from 20 to 40 pounds per ream dry weight of a second paste consisting essentially of 100 parts by weight silicone resin, 0.1 to 4 parts by weight benzoyl peroxide and 5 to 20 parts by weight of a filler selected from the group consisting of titanium dioxide, hydrated alumina, zinc oxide, silicon oxide, asbestos, and calcium carbonate; drying the second paste on the coated backing at a temperature of from 140° to 200° F. for a period of from 1 to 5 minutes; curing the silicone resin by heating the coated backing to a temperature of from 225° to 350° F. for a period of from 1 to about 5 minutes; and cooling the cured coated backing, and in which the silicone resin of each coating is composed of (1) 40–75% by weight of a benzene soluble resin copolymer of $SiO_2$ units and $R_3SiO_5$ units wherein R is a group selected from the group consisting of methyl, ethyl, propyl, vinyl and phenyl radicals, at least 90% of the total R radicals being aliphatic, and in which copolymer resin the ratio of $R_3SiO_5$ to $SiO_2$ units is from 0.6:1 to 0.9:1 inclusive, and (2) from 25–60% by weight of a hydroxyl end blocked diorgano-polysiloxane fluid of from 5,000 to less than 1,000,000 cs. viscosity at 25° C. in which polysiloxane the organic radicals are selected from the group consisting of methyl, ethyl, vinyl and phenyl radicals, at least 75% of the total number of radicals being aliphatic.

10. The process comprising: coating a thin sheet of aluminum foil with about 12 pounds per ream dry weight of a first paste consisting essentially of 100 parts by weight silicone resin, 0.1 to 5 parts by weight benzoyl peroxide, and sufficient inert diluent to render the paste workable; heating the coated backing to a temperature of from 140° to 180° F. for a period of from 1 to 5 minutes; cooling the heated coated backing; coating the coated backing with about 30 pounds per ream dry weight of a second paste consisting essentially of 100 parts by weight silicone resin, 0.1 to 4 parts by weight benzoyl peroxide and 5 to 20 parts by weight of a filler selected from the group consisting of titanium dioxide, hydrated alumina, zinc oxide, silicon oxide, asbestos, and calcium carbonate; drying the second paste on the coated backing at a temperature of from 140° to 200° F. for a period of from 1 to 5 minutes; curing the silicone resin by heating the coated backing to a temperature of from 225° to 350° F. for a period of from 1 to about 5 minutes; and cooling the cured coated backing, and in which the silicone resin of each coating is composed of mixtures of elastomeric organo-siloxanes and resinous organo-siloxanes in each of which the organic groups attached to the silicon atoms are methyl groups.

References Cited by the Examiner

UNITED STATES PATENTS

| | | | |
|---|---|---|---|
| 2,106,133 | 1/33 | Goldman | 117—75 XR |
| 2,639,276 | 5/53 | Smith-Johannsen et al. | 117—161 |
| 2,736,721 | 2/56 | Dexter | 117—122 XR |
| 2,751,314 | 6/56 | Keil | 117—75 XR |
| 2,789,155 | 4/57 | Marshall et al. | 260—46.5 |
| 2,814,601 | 11/57 | Curie et al. | 117—122 XR |
| 2,816,348 | 12/57 | Adamik | 117—122 XR |
| 2,824,026 | 2/58 | Homeyer et al. | 117—122 |
| 2,852,421 | 9/58 | Bergstedt | 148—6.14 |
| 2,857,356 | 10/58 | Goodwin | 117—122 XR |
| 2,902,389 | 9/59 | Keil | 117—122 |
| 3,032,438 | 5/62 | Gaynes et al. | 117—122 |

FOREIGN PATENTS 761,868　11/56　Great Britain.

WILLIAM D. MARTIN, *Primary Examiner.*

RICHARD D. NEVIUS, *Examiner.*